US007501729B2

(12) United States Patent  (10) Patent No.: US 7,501,729 B2
Takeuchi  (45) Date of Patent: Mar. 10, 2009

(54) THREE-PHASE MAGNETIC GENERATOR

(75) Inventor: Norikazu Takeuchi, Handa (JP)

(73) Assignees: Denso Corporation, Kariya (JP); Denso Trim Co., Ltd., Mie-gun (JP)

( * ) Notice: Subject to any disclaimer, the term of this patent is extended or adjusted under 35 U.S.C. 154(b) by 261 days.

(21) Appl. No.: 11/256,165

(22) Filed: Oct. 24, 2005

(65) Prior Publication Data

US 2006/0091746 A1 May 4, 2006

(30) Foreign Application Priority Data

Nov. 4, 2004  (JP)  ............................. 2004-320629
Jul. 28, 2005  (JP)  ............................. 2005-219318

(51) Int. Cl.
H02K 7/00  (2006.01)
(52) U.S. Cl. ........................... 310/71; 310/179; 310/180
(58) Field of Classification Search .................. 310/71, 310/43, 179–180, 216, 254, 258, 259, 261, 310/268
See application file for complete search history.

(56) References Cited

U.S. PATENT DOCUMENTS 5,173,628 A * 12/1992 Yoshida et al. ................. 310/71
5,519,271 A *  5/1996 Sakashita et al. .............. 310/71
6,091,172 A *  7/2000 Kakinuma et al. ............ 310/71
6,137,198 A * 10/2000 Kawamura ................... 310/71

FOREIGN PATENT DOCUMENTS

JP  A 2003-259588  9/2003

* cited by examiner

Primary Examiner—Thanh Lam
(74) Attorney, Agent, or Firm—Oliff & Berridge, PLC

(57) ABSTRACT

A terminal plate set has multiple terminal plates and fitting legs. Each terminal plate has a transverse bar portion and a longitudinal bar portion. If the fitting legs of the terminal plate set are press-fit into fitting through holes, terminals of the transverse bar portions are positioned on an axial end side of a rotor, and terminals of the longitudinal bar portions are positioned on the other axial end side of the rotor. The length of the transverse bar portions are adjusted so that the terminals of the transverse bar portions are positioned near coil wire leads to be connected with the terminals of the transverse bar portions.

7 Claims, 17 Drawing Sheets

THREE-PHASE MAGNETIC GENERATOR

CROSS REFERENCE TO RELATED APPLICATIONS

This application is based on and incorporates herein by reference Japanese Patent Application No. 2004-320629 filed on Nov. 4, 2004 and Japanese Patent Application No. 2005-219318 filed on Jul. 28, 2005.

BACKGROUND OF THE INVENTION

1. Field of the Invention

The present invention relates to a high-power and low-heat-generation three-phase magnetic generator that facilitates connection between a coil wire lead and an output lead.

2. Description of Related Art

A large-scale cruise motorcycle, which is used at the maximum rotation speed of an engine crankshaft of up to 10000 rpm, has many electric loads such as a headlight, a stereo and a heater. Therefore, the motorcycle uses a magnetization coil generator (alternator) that can provide a high output.

The generator is attached to a rear portion of the engine. The crankshaft accelerates and rotates the generator through a drive mechanism. A fan cools a power generation coil. Therefore, the generator can provide a high output.

Due to reasons related to an engine layout, it is required to use a high-power magnetic generator attached directly to the crankshaft instead of using the magnetization coil generator.

The magnetic generator can produce a high output by increasing an external diameter of a core and a volume of a rare-earth magnet. If an output current increases, temperature of the coil will increase. In order to reduce the coil temperature, the diameter of a coil wire has to be increased.

If the maximum output current is around 35A as before, the coil wire diameter of about 1.2 mm is sufficient. In this case, since the coil wire diameter is small, winding-start ends a, b, c and winding-finish ends a', b', c' of the coil wires can be manually lead among coils 26 as shown in FIG. 28 in wave-like shapes and can be gathered at a point A shown in FIG. 27 after the coil wires are wound as shown in FIG. 30. Then, the six coil wire leads 25 (the winding-start ends a, b, c and the winding-finish ends a', b', c') can be manually bundled at the point A. Then, the coil wire leads 25 gathered at the point A and output leads 41 are put into cylindrical sleeves 61 and fixed at a position B shown in FIG. 27, and are connected with each other by soldering. Then, the connected portions are covered by a protection tube 42, and the three output leads 41 are bundled with a clip 43. The bundled output leads 41 are fixed to a core 21 by threading a screw 44.

If the output current is 40A or over, the diameter of the wire of the coil 26 needs to be 1.3 mm or over. Thus, the coil wire diameter becomes thick. In such a case, if the coil wire leads 25 are lead and gathered to the point A manually, or the coil wire leads 25 are wound around each other and bundled to fix the coil wire leads 25 to the coil 26 manually as shown in FIGS. 27 and 28, there is a possibility that hands of a worker will become sore.

The coil wire leads 25 are gathered and fixed at the point A in order to reduce variation in a dimension L4 from the clip 43 to a grommet 62 shown in FIG. 29 after the coil wire leads 25 and the output leads 41 are connected. If the coil wire leads 25 are not fixed to the coil 26 at the point A, the coil wire leads 25 will easily move. As a result, the dimension L1 shown in FIGS. 28 and 29 will vary. The length L2 of the output lead 41 is determined in advance when the lead 41 is manufactured. If the dimension L1 varies, the dimension L3 between the clip 43 and the tip end of the connected portion will vary. Accordingly, the dimension L4 will vary. If the dimension L4 varies, a problem will be caused when the grommet 62 is attached to an engine cover 300 shown in FIG. 26. If the dimension L4 is too short, the grommet 62 cannot be fit into a groove 302 of the engine cover 300. If the dimension L4 is too long, a slack between the grommet 62 and the clip 43 becomes large, and a lead cover 63 will be pushed toward a rotor 1. As a result, there is a possibility that the lead cover 63 will contact an outer periphery of the rotor 1.

If the coil wire leads 25 are not fixed to the coil 26, the coil wire leads 25 will easily vibrate. Thus, vibration-resistance of the coil wire leads 25 will be deteriorated. Therefore, the coil wire leads 25 are fixed to the coil 26 to ensure the vibration-resistance of the coil wire leads 25.

If the output current is increased, the output leads 41 also have to be made thicker. In such a case, if two thick coil wire leads 25 and one thick output lead 41 are connected with each other, rigidity of the connected portion will increase. If the connected portion is soldered manually or fixed with the clip 43 manually, there is a possibility that the hands of the worker will become sore because the coil wire leads 25 are rigid and hard to move.

JP-A-2003-259588 describes a structure in which a terminal is knocked into a bobbin and a coil wire lead and an output lead are connected with each other through the terminal. However, this structure has the following defects. That is, in order to insert the bobbin into a core, a clearance is necessary in consideration with a dimensional tolerance. In addition, in order to form the bobbin, a thickness of about 0.7 mm is necessary. Therefore, heat conduction from the bobbin to the core is poor. Accordingly, heat radiation from the coil to the core is small, and the coil temperature will increase. A space for winding the coil wire is reduced, and only a thin coil wire can be wound. Accordingly, the coil temperature will increase. The terminal is just press-fit into a resin. Therefore, the terminal cannot endure vibration of the thick coil wire lead or the thick output lead. As a result, there is a possibility that the terminal will slacken.

SUMMARY OF THE INVENTION

It is therefore an object of the present invention to provide a three-phase magnetic generator that provides a high output but generates a low amount of heat while facilitating connection between a coil wire lead and an output lead.

According to an aspect of the present invention, a three-phase magnetic generator has a rotor and a stator. The rotor has multiple rare-earth magnets. The stator has multiple coil groups wound around winding portions of a core. The generator further has a coil gathering portion and a connector unit. The gathering portion is provided on an axial end side of the core. The coil wire leads of the multiple coil groups are gathered up at the gathering portion. The connector unit has a plurality of connectors and a uniting portion. Each one of the connectors penetrates the core in the axial direction and has a first terminal connected with the coil gathering portion and a second terminal that is connected with an output lead on the other axial end side of the core. The uniting portion is made of a resin and unites the connectors.

Thus, the coil wire leads of the multiple coil groups can be connected with the output leads through the connectors.

BRIEF DESCRIPTION OF THE DRAWINGS

Features and advantages of exemplary embodiments will be appreciated, as well as methods of operation and the func

DETAILED DESCRIPTION OF EXEMPLARY EMBODIMENTS

Figure 1:
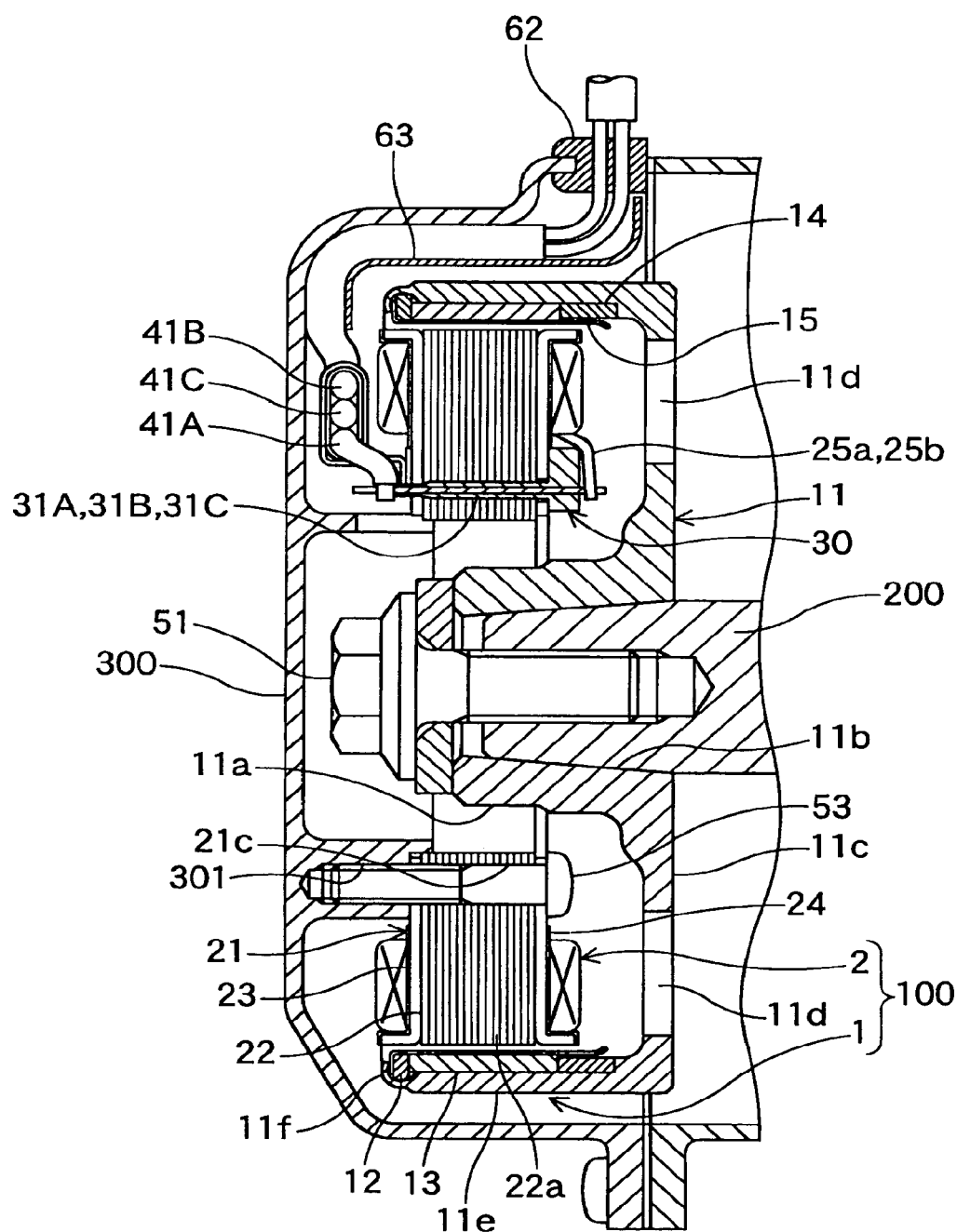
- FIG. 1 is a longitudinal cross-sectional view showing a three-phase magnetic generator according to an exemplary embodiment of the present invention.

Referring to FIG. 1, a three-phase magnetic generator 100 according to an exemplary embodiment of the present invention is illustrated.

The generator 100 has a rotor 1 fixed to a crankshaft 200 of an engine and a stator 2 that is fixed to an engine cover 300 and disposed radially inside the rotor 1.

A pole number of the rotor 1 is 4n (n=5), or 20. A pole number of the stator 2 is 3n, or 15.

The rotor 1 has a rotary member 11 made of a magnetic material. Finishing treatment is applied to the rotary member 11 by performing cutting after a hot forging process. A tapered portion 11b is formed on an inside of a boss 11a at the center of the rotary member 11. The tapered portion 11b is fit and fixed to an end of the crankshaft 200 by a bolt 51. Multiple cooling through holes 11d are formed on an end surface 11c of the rotary member 11. A cylindrical outer periphery 11e of the rotary member 11 provides a yoke. Ring-shaped nonmagnetic spacers 12, 14 and twenty rare-earth magnets 13 are disposed along the axial direction of the crankshaft 200 inside the outer periphery 11e of the rotary member 11. The twenty rare-earth magnets 13 are arranged along a circumferential direction at an equal interval. A magnet protection ring 15 is disposed radially inside the rare-earth magnets 13, and a tip end 11f of the rotary member outer periphery 11e is crimped. Thus, the rare-earth magnets 13 are fixed to the inner peripheral surface of the rotary member outer periphery 11e. The magnet protection ring 15 is manufactured by pressing a stainless-steel plate.

The stator 2 has a core 21. The core 21 has stacked core sheets 22 manufactured by stacking multiple core sheets 22a that are made by pressing electromagnetic steel plates. The core 21 has core end plates 23 on both sides of the stacked core sheets 22. The core end plate 23 is slightly thicker than the core sheet 22a. The stacked core sheets 22 and the core end plates 23 are integrated by crimping rivets 52 shown in FIGS. 2 and 3.

Figure 10:
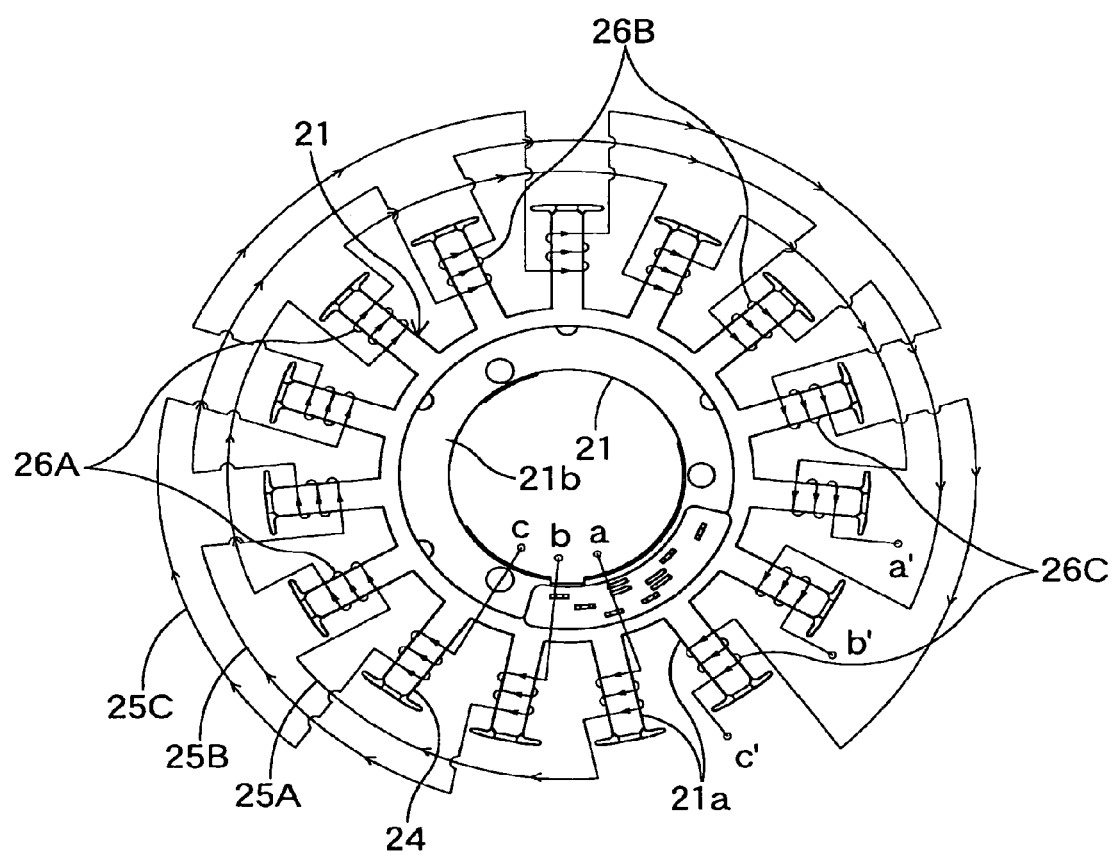
FIG. 10 is a diagram showing a winding manner of wires around a stator of the generator according to the FIG. 1 embodiment.
Figure 11:
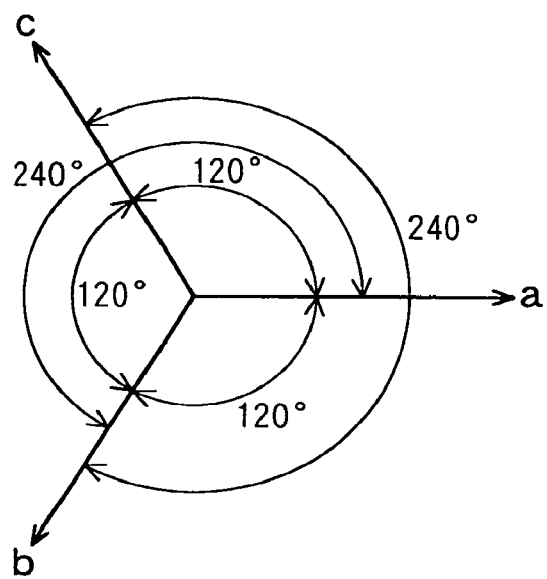
FIG. 11 is a vector diagram showing output voltage of the generator according to the FIG. 1 embodiment.
Figure 12:
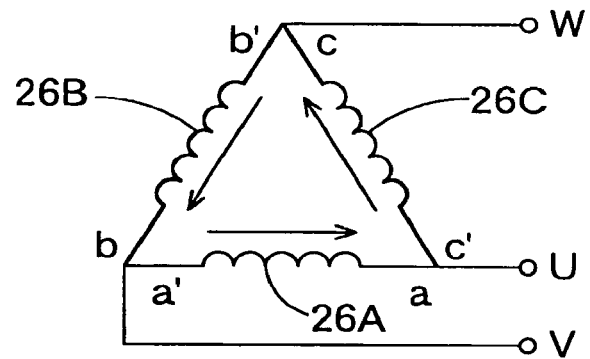
FIG. 12 is a connection diagram of the stator of the generator according to the FIG. 1 embodiment.

Surfaces of winding portions 21a of the core 21 shown in FIG. 10 are electrically insulated by a powder resin coating layer 24 made of an epoxy resin. Copper wires 25A, 25B, 25C, diameters of which are from 1.3 mm to 2 mm, are wound around the powder resin coating layer 24 to form three coil groups 26A, 26B, 26C as shown in FIG. 10. The coil groups 26A-26C are formed by performing concentrated winding of the copper wires 25A-25C from winding-start ends a, b, c to winding-finish ends a', b', c' in the same direction while skipping two coils respectively. The coil groups 26A-26C are connected into a delta connection so that electric angle phase differences are 240° as shown in FIGS. 11 and 12. The thus-formed coil groups 26A-26C can provide a three-phase output, having an electric angle phase difference of 120°.

Figure 5:
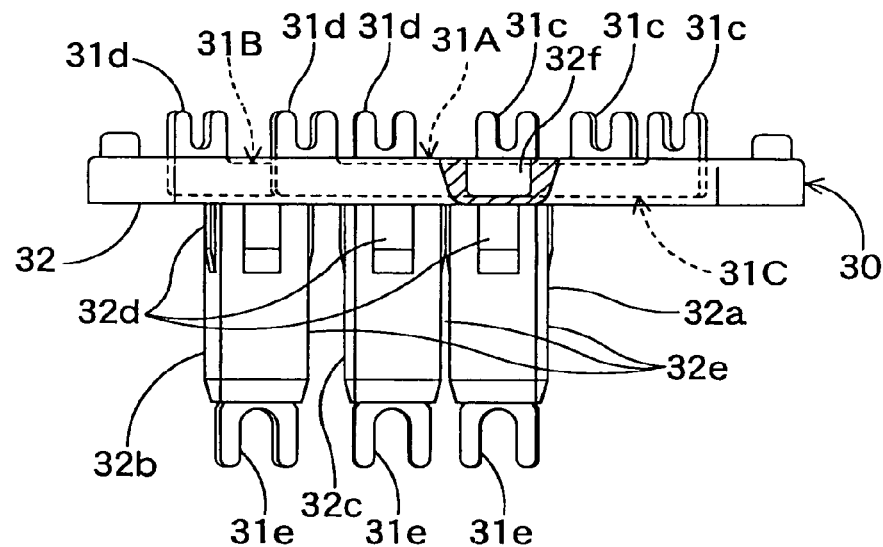
FIG. 5 is a side view showing the terminal plate set of the generator according to the FIG. 1 embodiment.
Figure 6:
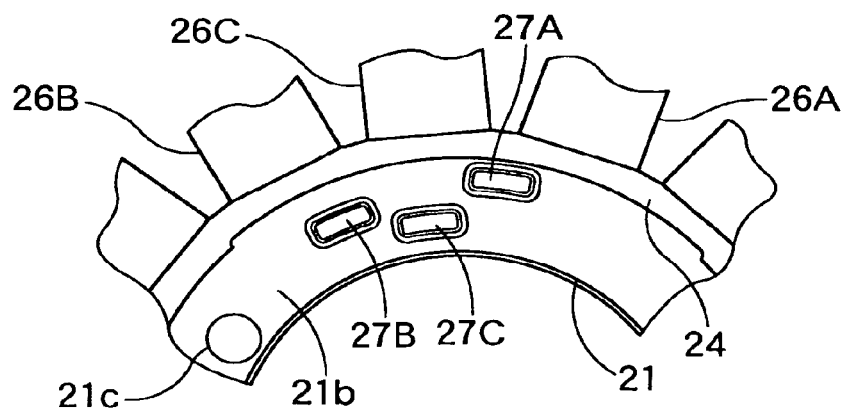
FIG. 6 is a view showing fitting through holes formed in a core of the generator according to the FIG. 1 embodiment.
Figure 7:
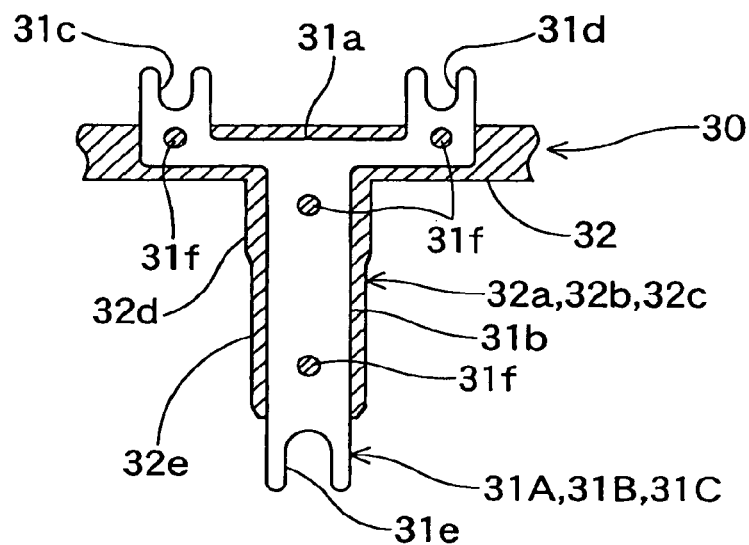
FIG. 7 is a longitudinal cross-sectional view showing the terminal plate set according to the FIG. 1 embodiment.
Figure 8:
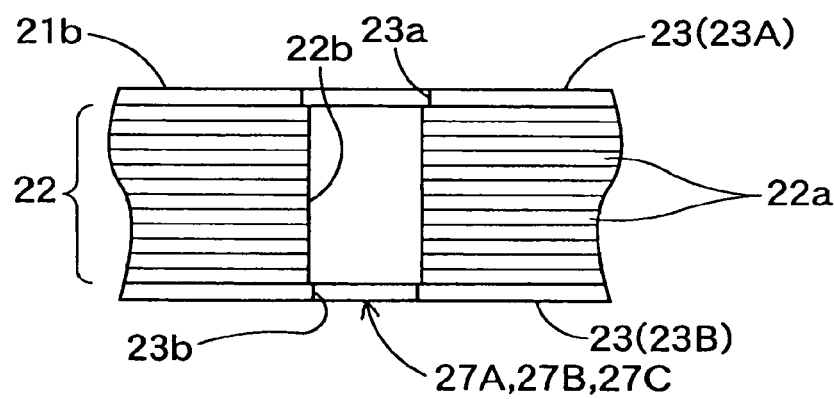
FIG. 8 is a longitudinal cross-sectional view showing the fitting through hole formed in the core of the generator according to the FIG. 1 embodiment.

Fitting through holes 27A, 27B, 27C are formed in an annular portion 21b of the core 21 on base end sides of the winding portions 21a as shown in FIGS. 6 and 8. Each one of the fitting through holes 27A-27C provides a hole 23a in the core end plate 23 (23A) positioned on a back side (engine side) of the rotor 1, and a hole 23b in the core end plate 23 (23B) positioned on an open side (front side) of the rotor 1. As shown in FIG. 8, the diameter of the hole 23a in the back side core end plate 23A is slightly larger than the diameter of the hole 22b of the stacked core sheets 22. The hole 23b in the open side core end plate 23B is slightly smaller than the diameter of the hole 22b of the stacked core sheets 22. A terminal plate set 30 shown in FIGS. 3, 4, 5, 7, 9, etc. is fastened into the three fitting through holes 27A-27C.

The terminal plate set 30 has three terminal plates (connectors) 31A, 31B, 31C and a resin mold (uniting portion) 32 that fixes and holds the three terminal plates 31A-31C.

As shown in FIG. 7, each one of the terminal plates 31A-31C has a transverse bar portion 31a and a longitudinal bar portion 31b and is formed in a T-shape. The transverse bar portion 31a provides two terminals 31c, 31d to be connected with coil wire leads. A tip end of the longitudinal bar portion 31b provides a terminal 31e to be connected with an output lead.

Figure 4:
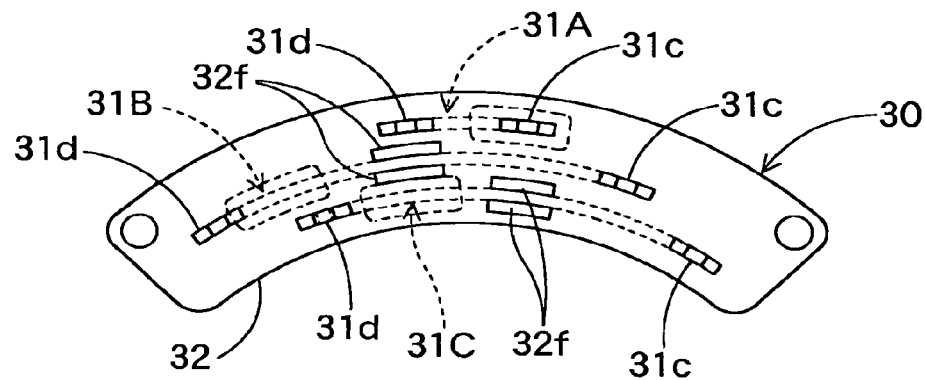
FIG. 4 is a plan view showing a terminal plate set of the generator according to the FIG. 1 embodiment.
Figure 9:
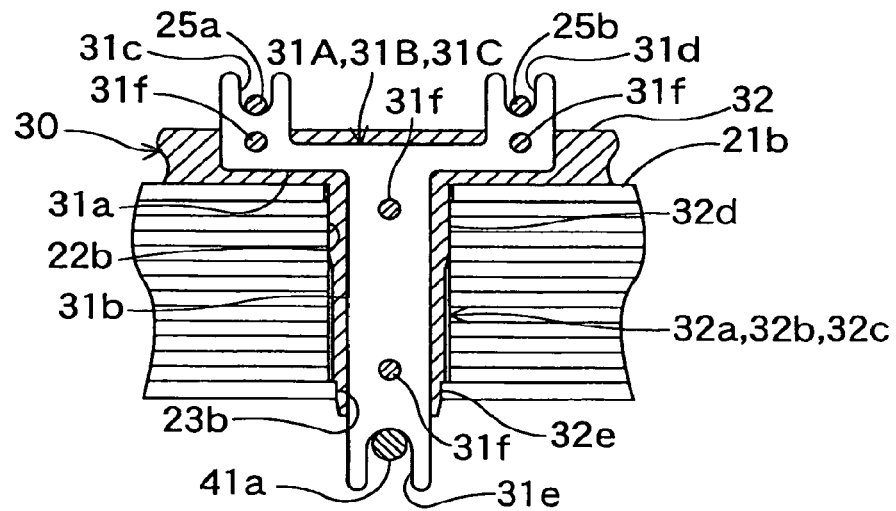
FIG. 9 is a longitudinal cross-sectional view showing the terminal plate set fixed into the fitting through hole of the generator according to the FIG. 1 embodiment.

As shown in FIGS. 5, 7, 9, the resin mold 32 covers and fixes the three terminal plates 31A-31C except the terminals 31c, 31d of the transverse bar portions 31a and the terminals 31e of the longitudinal bar portions 31b. As shown in FIGS. 4 and 5, the resin mold 32 is formed with grooves 32f formed by a positioning device. The positioning device prevents connection between the terminal plates 31A-31C set on a molding die due to a molding pressure when the resin mold 32 is molded. The terminal plates 31A-31C are formed with bonding holes 31f. The bonding holes 31f are filled with a resin material when the resin mold 32 is molded to increase the bonding strength between the terminal plates 31A-31C and the resin mold 32. Fitting legs 32a, 32b, 32c are formed around the longitudinal bar portions 31b and are press-fit into the fitting through holes 27A-27C respectively.

Each one of the fitting legs 32a-32c has a wide portion 32d formed on a base end side thereof and a narrow portion 32e formed on a tip end side thereof. The wide portion 32d is press-fit into the hole 22b of the stacked core sheets 22. The narrow portion 32e is press-fit into the hole 23b of the core end plate 23 (23B) formed in the open side of the rotor 1. Thus, the fitting legs 32a-32c are tightly fixed at upper and lower points inside the fitting through holes 27A-27C of the core 21. The diameter of the hole 23a of the core end plate 23 (23A) formed in the back side of the rotor 1 is larger than the diameter of the hole 22b of the stacked core sheets 22. Therefore, when the terminal plate set 30 is inserted from the side of the core end plate 23 (23A) positioned on the back side of the rotor 1, the fitting legs 32a-32c can be easily lead into the fitting through holes 27A-27C.

Figure 2:
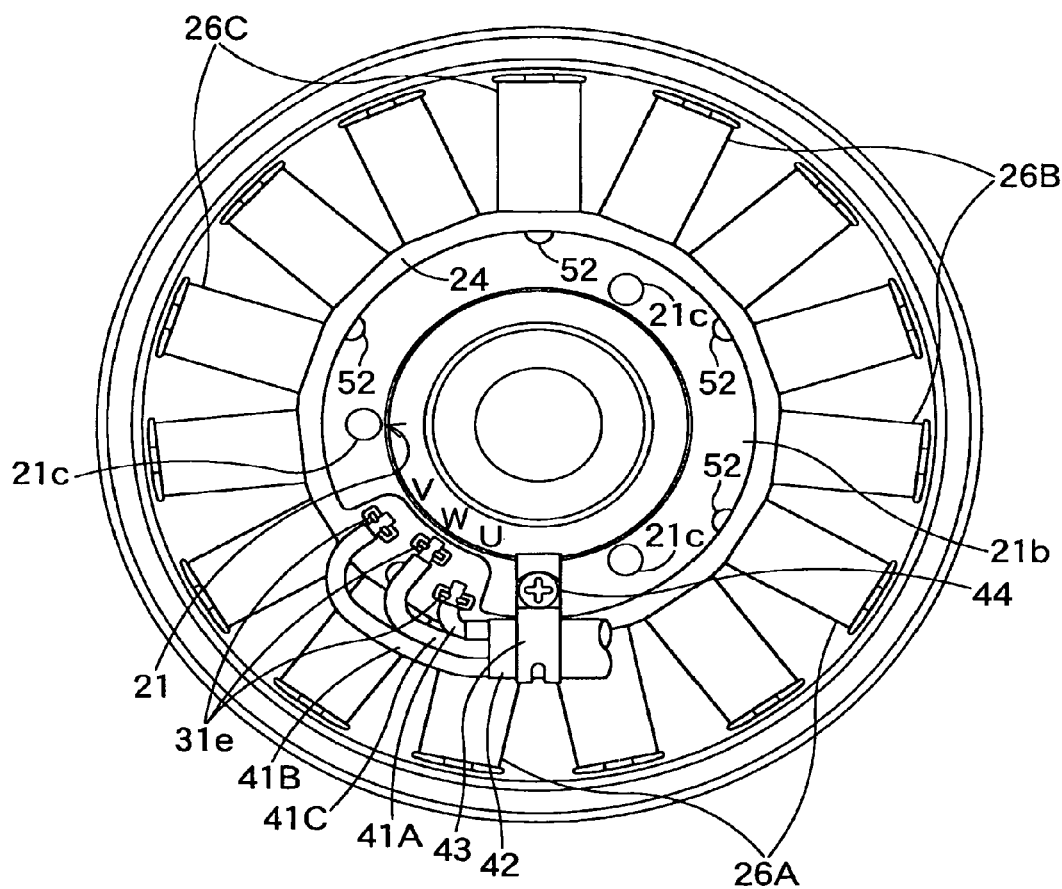
FIG. 2 is a front view showing the generator according to the FIG. 1 embodiment.
Figure 3:
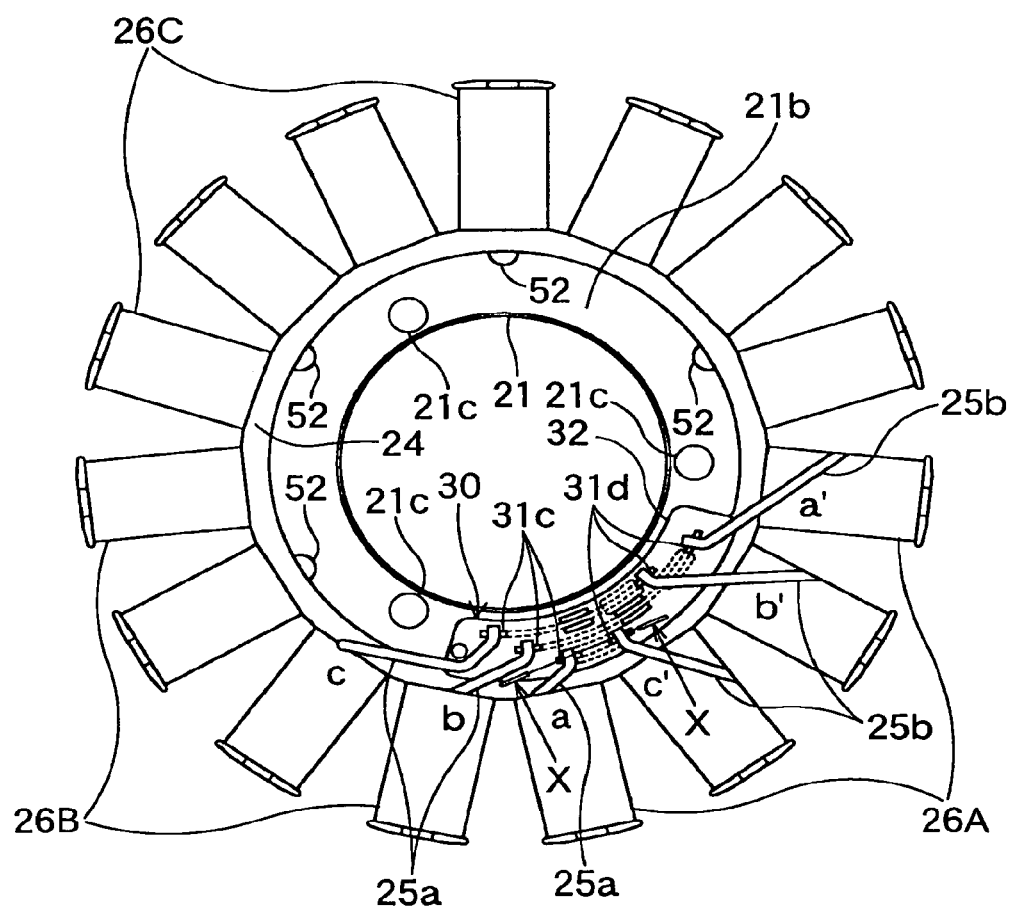
FIG. 3 is a rear view showing the generator according to the FIG. 1 embodiment.

The terminal plate set 30 is structured so that the terminals 31c, 31d of the transverse bar portions 31a of the terminal plates 31A-31C are positioned on the back side of the rotor 1 and the terminals 31e of the longitudinal bar portions 31b of the terminal plates 31A-31C are positioned on the open side of the rotor 1 when the fitting legs 32a-32c are press-fit into the fitting through holes 27A-27C as shown in FIGS. 2 and 3. The lengths of the transverse bar portions 31a are adjusted in advance so that the terminals 31c, 31d of the transverse bar portions 31a are positioned near the ends of the coil wire leads 25a, 25b (winding-start ends a, b, c and winding-finish ends a', b', c'), which are respectively connected with the terminals 31c, 31d.

The terminals 31c, 31d of each one of the terminal plates 31A-31C are formed substantially in U-shapes. The coil wire lead (the winding-start end) of one coil group is held and fixed to one U-shaped groove of one of the terminals 31c, 31d, and soldered. Then, the coil wire lead (the winding-finish end) of another coil group is held and fixed to the U-shaped groove of the other one of the terminals 31c, 31d, and soldered. For example, the coil wire lead 25a (the winding-start end a) of the coil group 26A is connected to the terminal 31c of the terminal plate 31A. The coil wire lead 25b (the winding-finish end c') of the coil group 26C is connected to the terminal 31d of the terminal plate 31A. The coil wire lead 25a (the winding-start end b) of the coil group 26B is connected to the terminal 31c of the terminal plate 31B. The coil wire lead 25b (the winding-finish end a') of the coil group 26A is connected to the terminal 31d of the terminal plate 31B. The coil wire lead 25a (the winding-start end c) of the coil group 26C is connected to the terminal 31c of the terminal plate 31C. The coil wire lead 25b (the winding-finish end b') of the coil group 26B is connected to the terminal 31d of the terminal plate 31C. Thus, a delta connection of the three coil groups 26A-26C is obtained as shown in FIG. 12.

Each one of the terminals 31e of the terminal plates 31A-31C is formed substantially in a U-shape. Each one of cores 41a of the output leads 41A-41C is held and fixed in the U-shaped groove of each one of the terminals 31e, and then, is soldered. For example, the output lead 41A (U-phase) is connected to the terminal 31e of the terminal plate 31A. The output lead 41B (V-phase) is connected to the terminal 31e of the terminal plate 31B. The output lead 41C (W-phase) is connected to the terminal 31e of the terminal plate 31C. The three output leads 41A-41C are fixed by a clip 43 through a protection tube 42. The clip 43 is fastened to the core 21 by a fastening screw 44.

Fastening screws 53 are inserted through screw insertion through holes 21c formed in the core 21, and are screwed into threaded holes 301 formed in the engine cover 300. Thus, the stator 2 is fixed to the engine cover 300.

Figure 13:
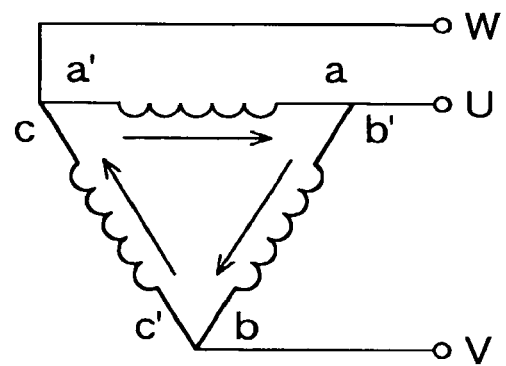
FIG. 13 is a connection diagram of a stator of a three-phase magnetic generator of a modified example.
Figure 14:
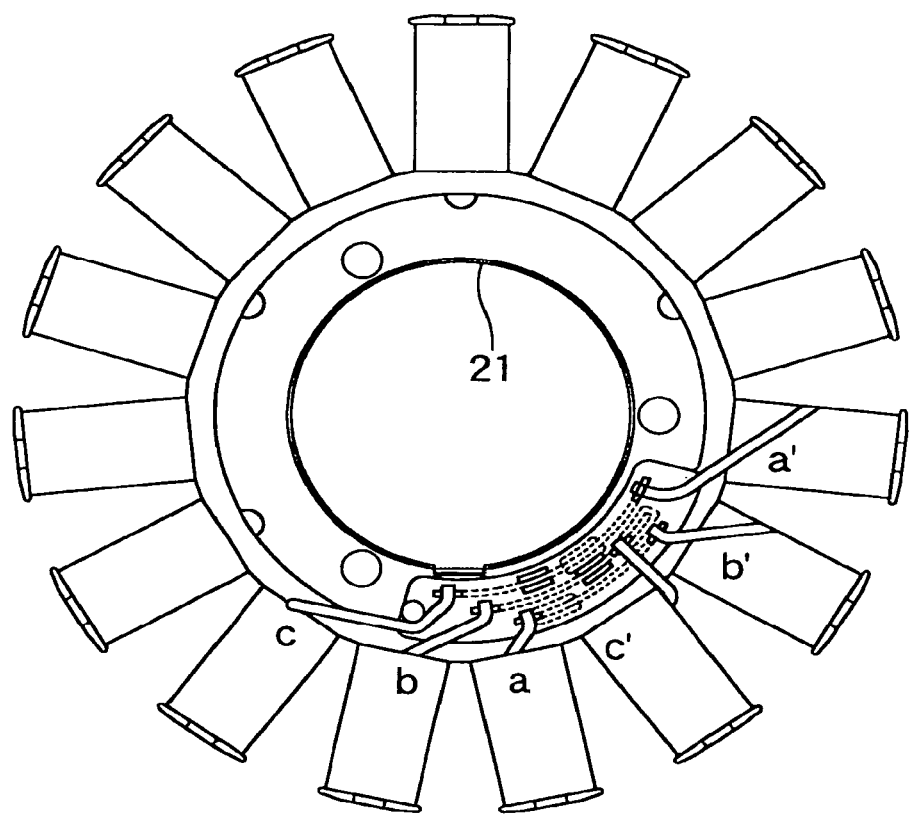
FIG. 14 is a rear view showing the stator of the generator according to the FIG. 1 embodiment.

In the case where the terminal plates 31A-31C of the terminal plate set 30 are structured as shown in FIG. 14 and the terminals 31c, 31d of the terminal plates 31A-31C and the coil wire leads 25a, 25b of the coil groups 26A-26C are connected as shown in FIG. 14, a delta connection of the three coil groups 26A-26C is provided as shown in FIG. 13. The variable n of the pole number may be an integer selected from a group from 4 to 8. The sectional shape of each one of the fitting through holes 27A-27C is not limited to the rectangular shape shown in FIG. 6, but may be other shape such as an elliptic shape. The wide portion 32d of each one of the fitting legs 32a-32c of the terminal plate set 30 may be provided on all four faces of each one of the terminal plates 31A-31C as shown in FIG. 5. Alternatively, the wide portion 32d may be provided on two opposing faces of each one of the terminal plates 31A-31C.

The three-phase magnetic generator 100 of this exemplary embodiment is structured so that the pole number of the rotor 1 is 4n (n=5 or an integer selected from a group from 4 to 8) and the pole number of the stator 2 is 3n. If the variable n is 3 or less, the pole number of the rotor 1 becomes 12 or less, and generation frequency is reduced. In such a case, the winding number of each one of the coil groups 26A-26C has to be increased. As a result, it is difficult to wind the thick copper wires 25A-25C. In this exemplary embodiment, because the variable n is set at 4 or over, the pole number of the rotor 1 is 16 or over. Thus, the generation frequency increases, and the winding numbers of the coil groups 26A-26C can be reduced. As a result, the winding work of the thick copper wires 25A-25C becomes easier. If the variable n is 9 or over, the pole number of the stator 2 becomes 27 or over. In such a case, a clearance between adjacent poles becomes too narrow, and it becomes difficult to wind the thick copper wires 25A-25C. In this exemplary embodiment, the variable n is 8 or less. Therefore, the pole number of the stator 2 becomes 24 or less, and a clearance between the adjacent poles is not too narrow.

Accordingly, the winding work of the thick copper wires 25A-25C becomes easier. If the variable n is 4, the pole number of the rotor 1 is 16, and the generation frequency becomes 1333 Hz when the generator 100 is operated at the maximum rotation speed of 10000 rpm. Therefore, an inexpensive regulator using an SCR (silicon-controlled rectifier) element can be used as a regulator for controlling an output voltage of the generator. In the case where the variable n is 5 or over, an FET (field-effect transistor) element, which is more expensive than the SCR element, has to be used as the regulator. However, since the generation frequency increases, the winding number can be reduced. Thus, a high-power and low-heat-generation three-phase magnetic generator can be provided.

In this exemplary embodiment, when the terminal plate set 30 is fixed to the core 21, the terminals 31c, 31d of the terminal plates 31A-31C are positioned near the ends of the coil wire leads 25a, 25b to be connected with the terminals 31c, 31d. Therefore, the thick coil wire leads 25a, 25b can be easily connected with the terminals 31c, 31d. Thus, the coil wire leads 25a, 25b and the output leads 41A-41C can be easily connected with each other through the terminal plates 31A-31C.

The terminal plates 31A-31C are formed with the bonding holes 31f filled with the resin. The bonding holes 31f are filled with the resin material when the resin mold 32 is molded. Therefore, the bonding strength between the terminal plates 31A-31C and the resin mold 32 is increased.

The three-phase magnetic generator 100 of this exemplary embodiment has a gathering portion of the coil wire leads 25a, 25b on one end side of the core 21 shown in FIG. 3. The coil wire leads 25a, 25b are gathered to the gathering portion. The coil wire leads 25a, 25b gathered to the gathering portion are connected with the terminals 31c, 31d of the terminal plates 31A-31C. The output leads 41A-41C are connected with the terminals 31e of the terminal plates 31A-31C on the other end side of the core 21 shown in FIG. 2. The resin mold 32 unites the terminal plates 31A-31C.

Figure 15:
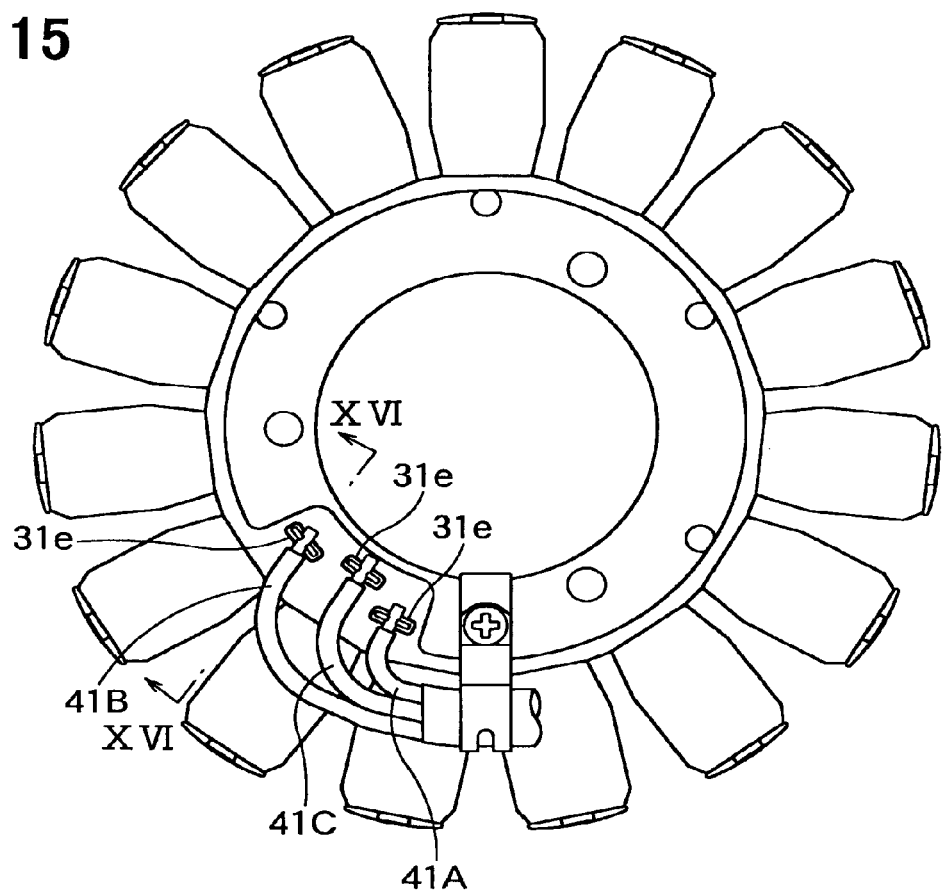
FIG. 15 is a front view showing the stator of the generator according to the FIG. 1 embodiment.
Figure 16:
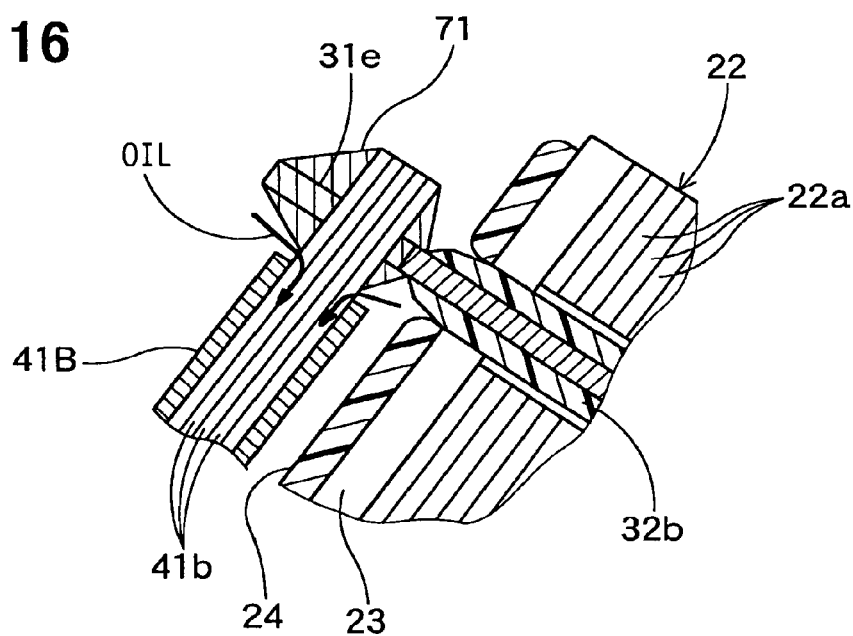
FIG. 16 is a sectional view showing the stator of FIG. 15 taken along the line XVI-XVI.

FIG. 15 is a front view showing the stator 2 of this exemplary embodiment. FIG. 16 is a sectional view showing the stator 2 of FIG. 15 taken along the line XVI-XVI. A numeral 71 in FIG. 16 shows a soldered portion. In the three-phase magnetic generator of this exemplary embodiment, there is a possibility that coil cooling engine oil that is injected or dispersed due to agitation can be attached to the connection between the output lead 41B and the terminal 31e, and can enter a clearance between core wires 41b of the output lead 41B as shown in FIG. 16. The engine oil can leak from a connector disposed outside the engine cover 300 due to a capillary phenomenon. The same problem also can occur at the output leads 41A, 41C. In order to overcome this problem, the clearance between the core wires 41b may be eliminated by infiltrating varnish into the output leads 41A-41C. However, the output leads 41A-41C will be hardened by the penetration of the varnish, and will cause difficulty in assembling work.

Therefore, a three-phase magnetic generator according to another exemplary embodiment shown in FIGS. 17 to 20 aims to prevent leakage of the engine oil, while ensuring the flexibility of the output leads 41A-41C.

Figure 17:
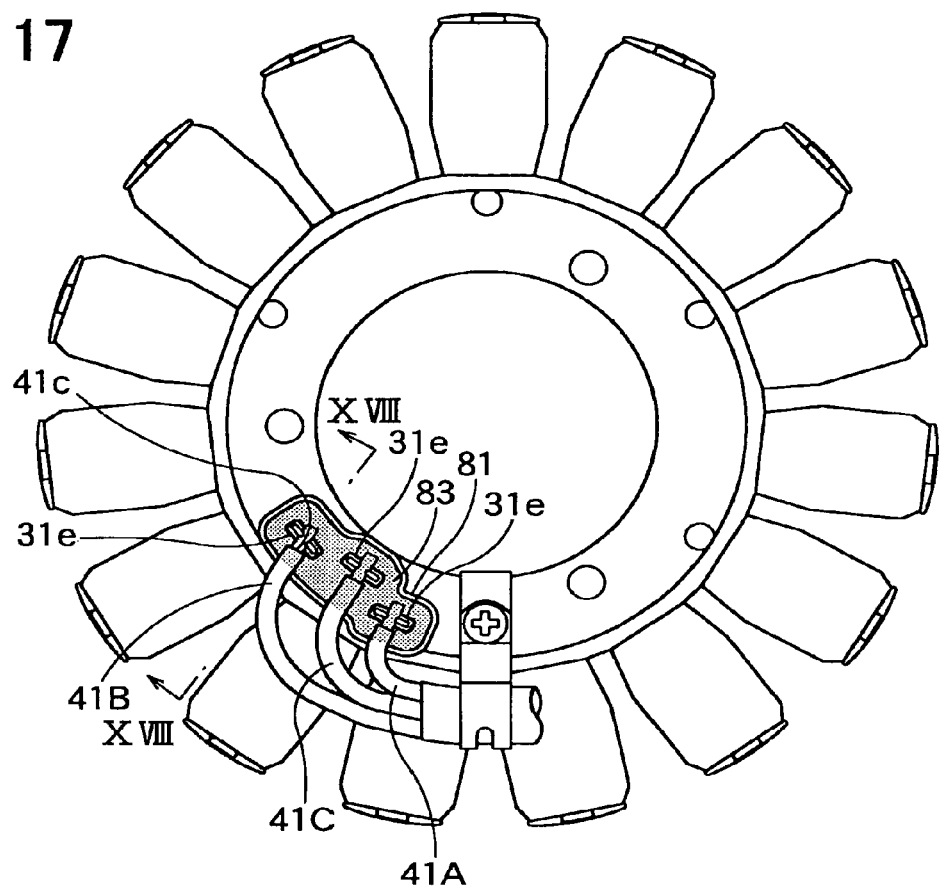
FIG. 17 is a front view showing a three-phase magnetic generator according to another exemplary embodiment of the present invention.
Figure 18:
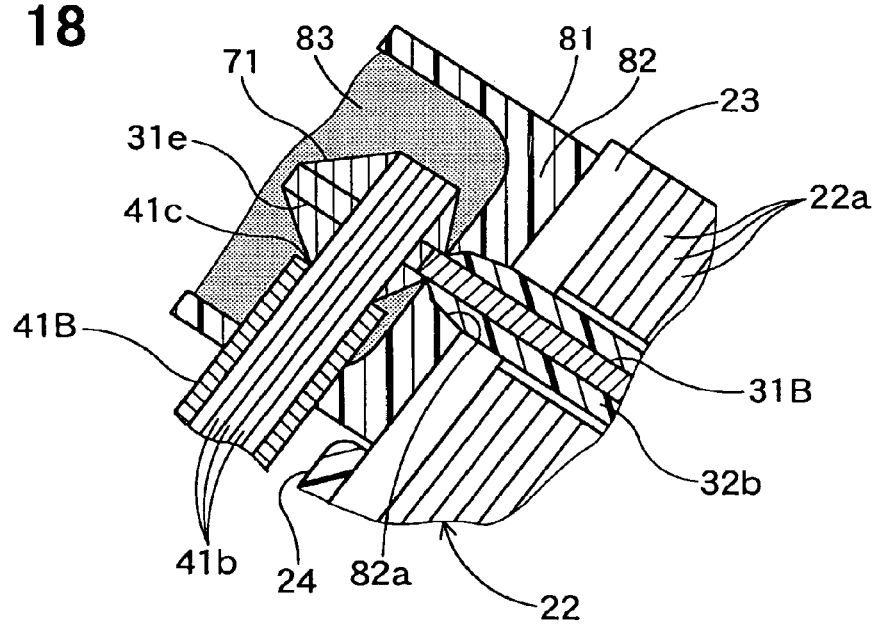
FIG. 18 is a sectional view showing the generator of FIG. 17 taken along the line XVIII-XVIII.
Figure 19:
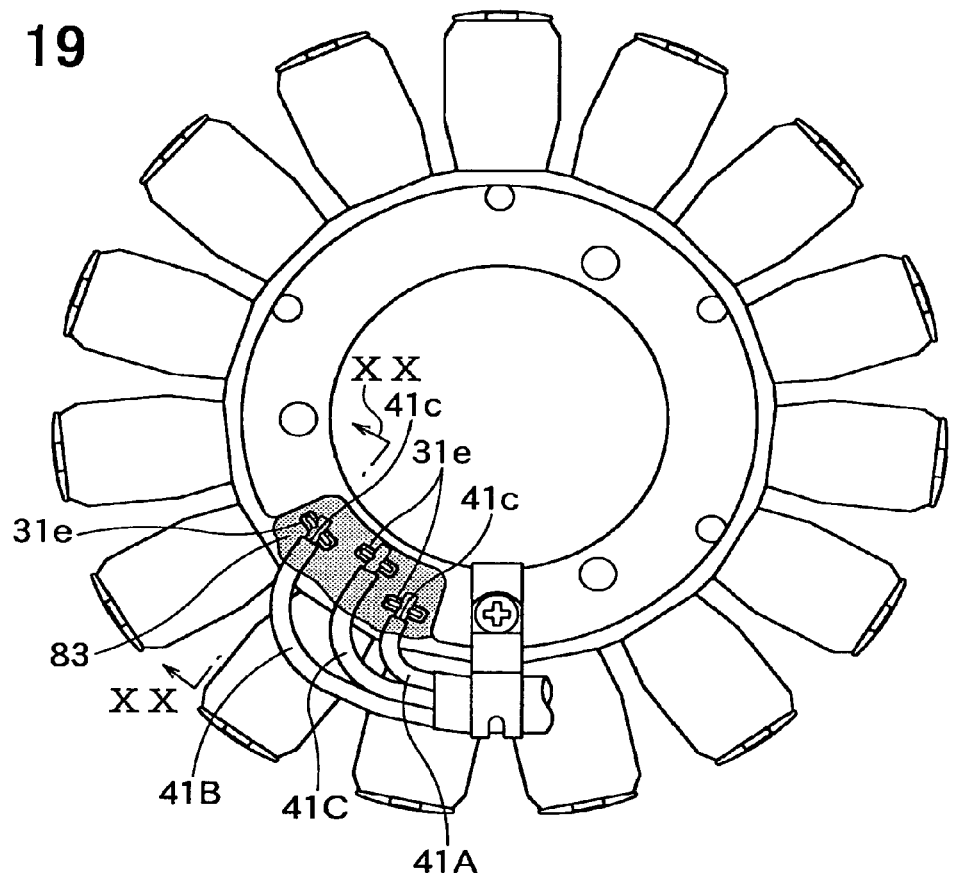
FIG. 19 is a front view showing a three-phase magnetic generator according to another exemplary embodiment of the present invention.
Figure 20:
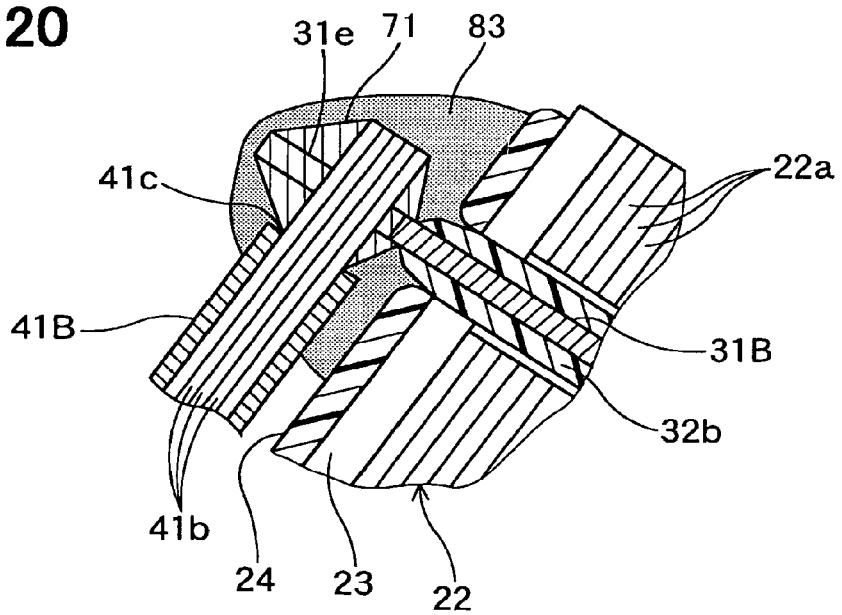
FIG. 20 is a sectional view showing the generator of FIG. 19 taken along the line XX-XX.
Figure 21:
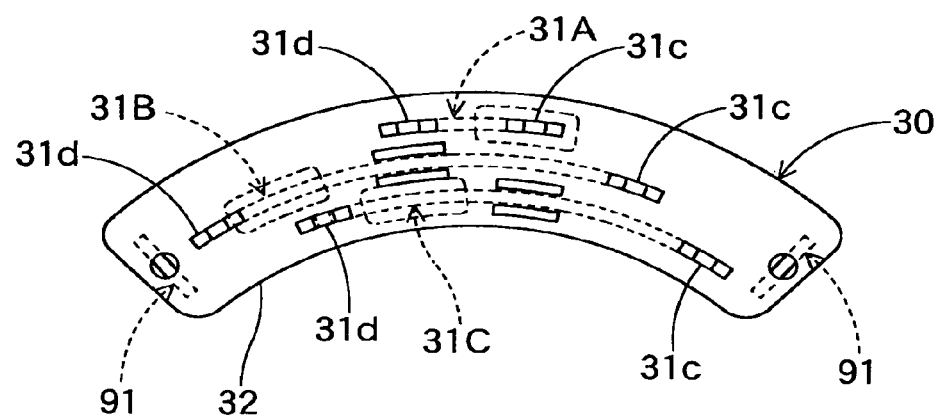
FIG. 21 is a plan view showing a terminal plate set of a three-phase magnetic generator according to a further exemplary embodiment of the present invention.
Figure 22:
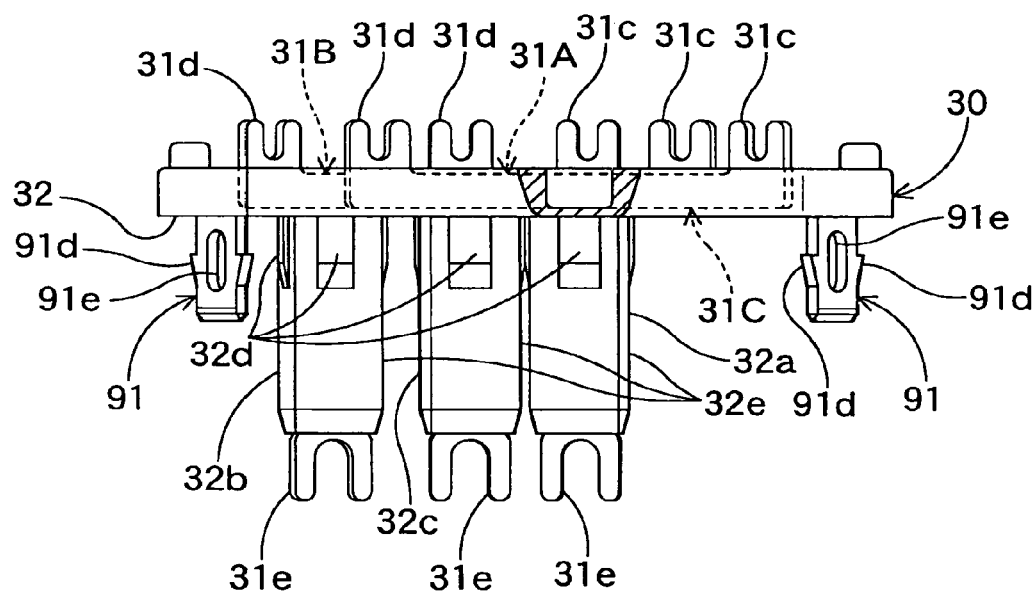
FIG. 22 is a side view showing the terminal plate set according to the FIG. 21 embodiment.
Figure 23:
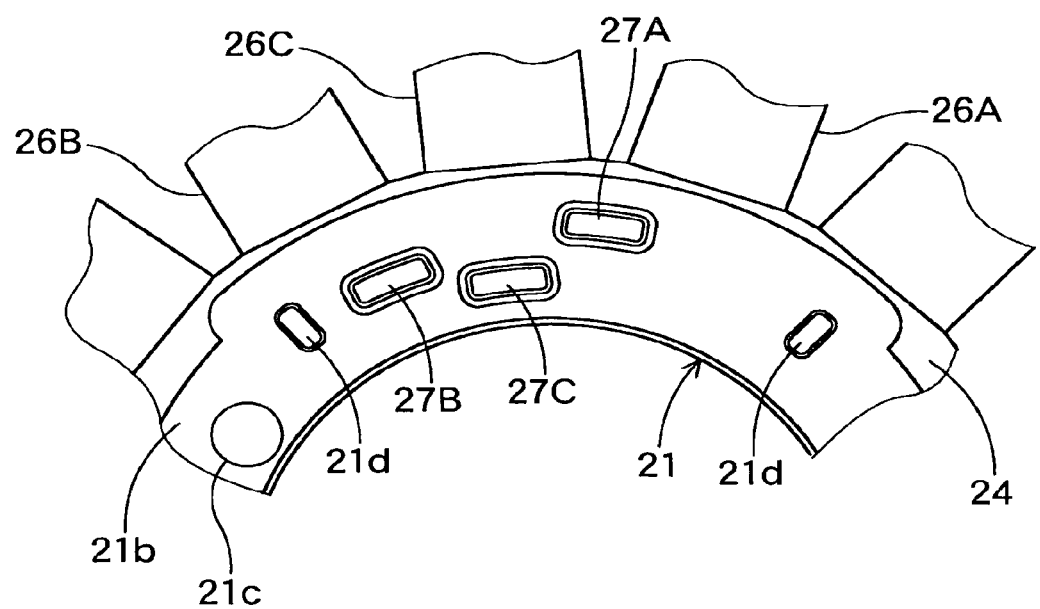
FIG. 23 is a plan view showing fitting through holes formed in a core of the generator according to the FIG. 21 embodiment.
Figure 24:
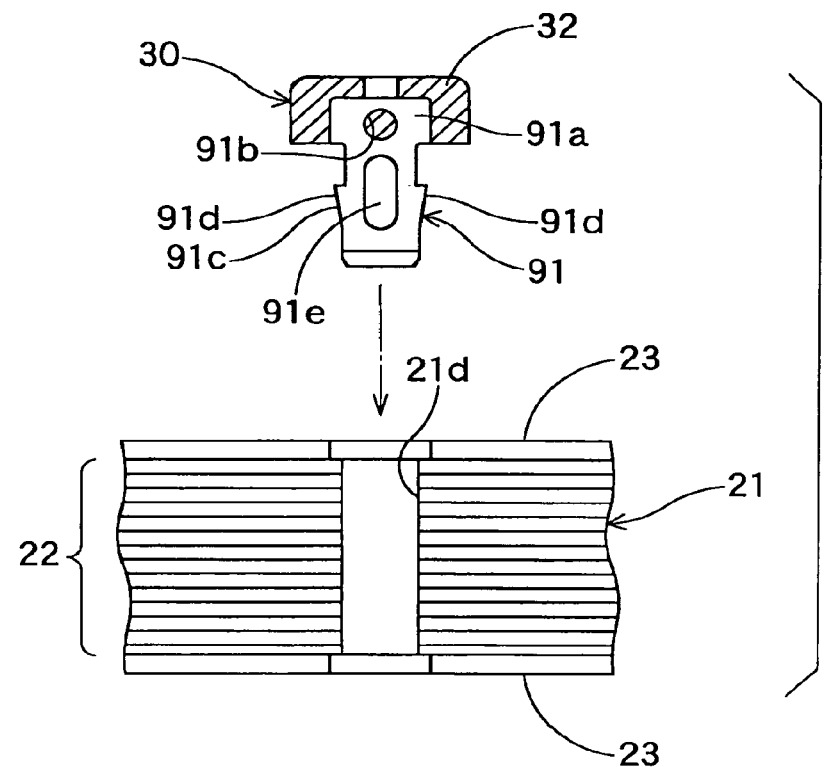
FIG. 24 is a longitudinal cross-sectional view showing the terminal plate set and the core of the generator according to the FIG. 21 embodiment.
Figure 25:
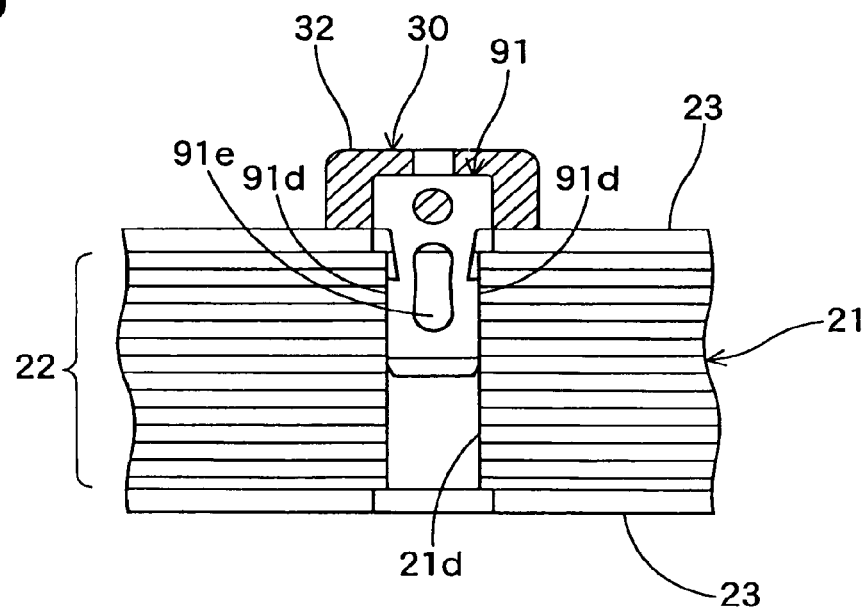
FIG. 25 is a longitudinal cross-sectional view showing the terminal plate set press-fit into the core of the generator according to the FIG. 21 embodiment.
Figure 26:
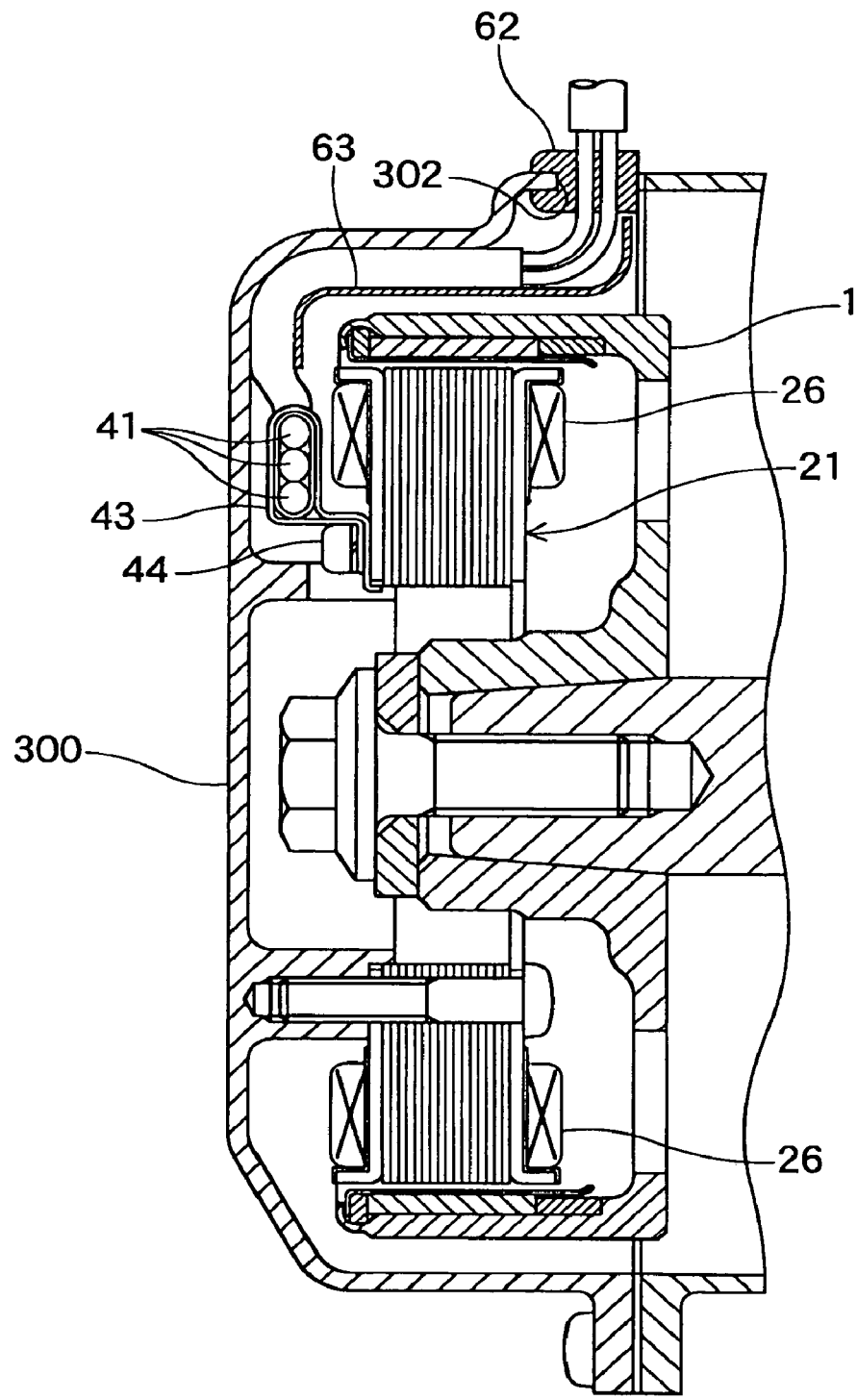
FIG. 26 is a longitudinal cross-sectional view showing a three-phase magnetic generator of a related art.
Figure 27:
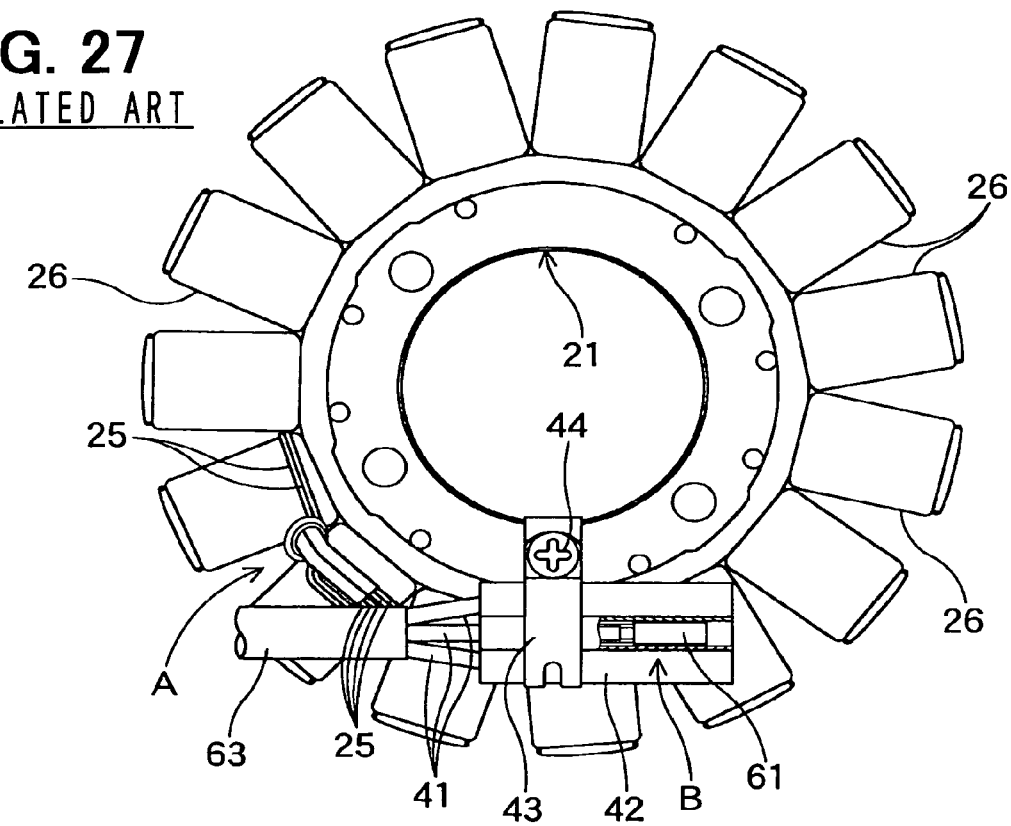
FIG. 27 is a front view showing a stator of the generator of the related art.
Figure 28:
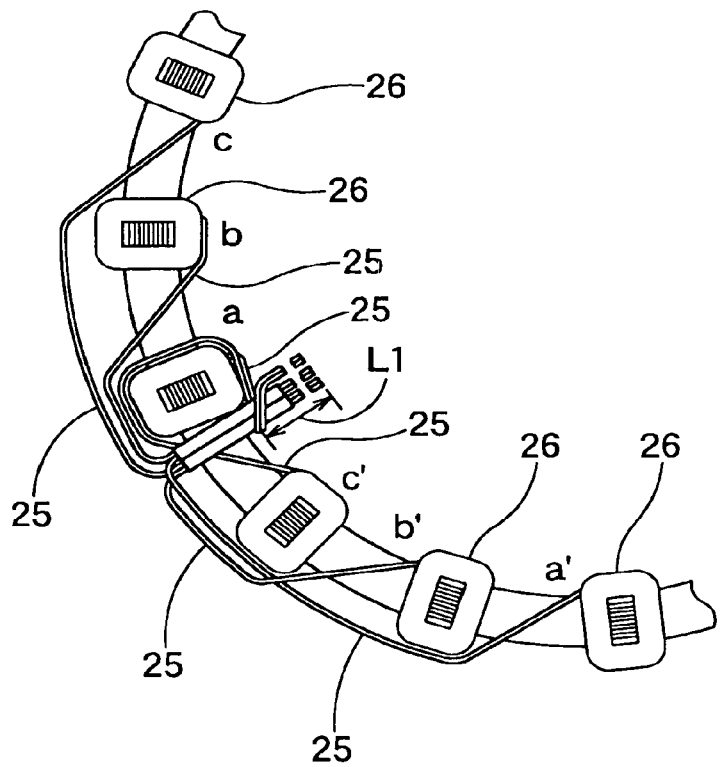
FIG. 28 is a front view showing the stator of the generator of the related art.
Figure 29:
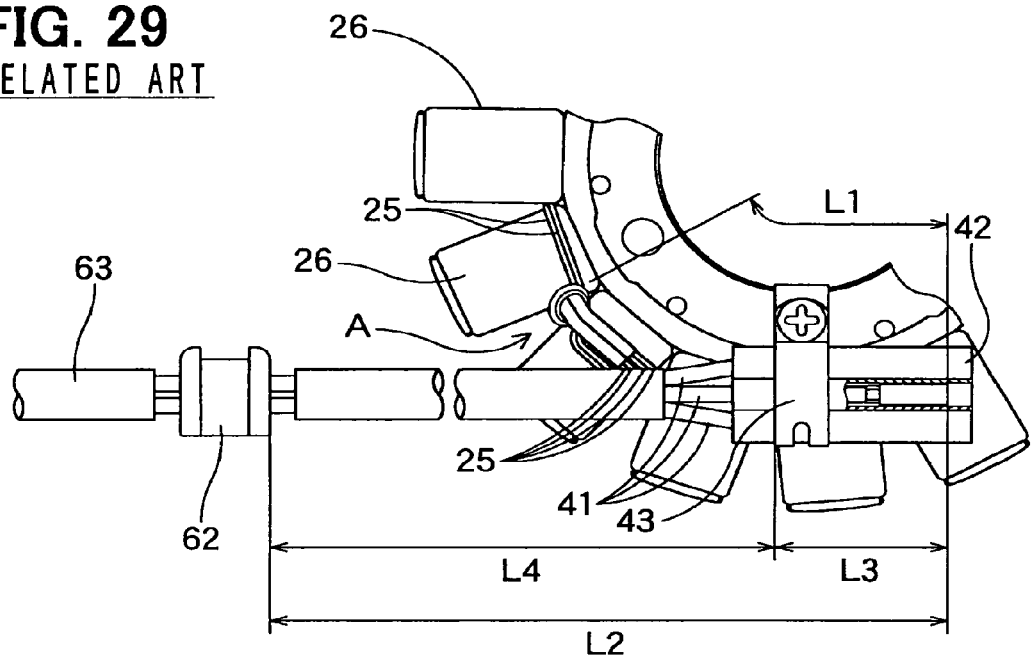
FIG. 29 is a view showing output leads and the stator of the generator of the related art.
Figure 30:
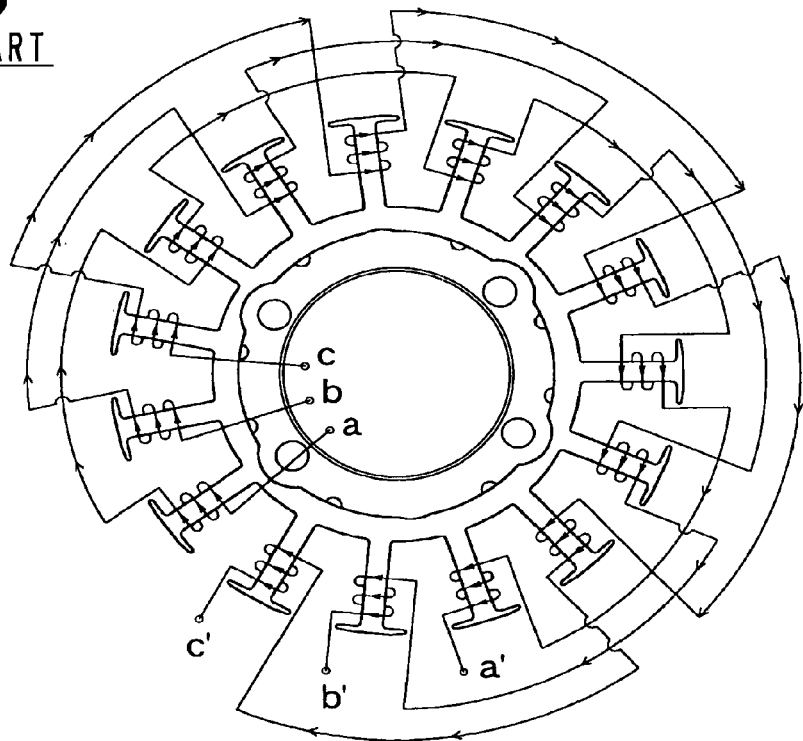
FIG. 30 is a connection diagram of the stator of the generator of the related art.

The three-phase magnetic generator shown in FIGS. 17 and 18 has a terminal insulation cup 81. The terminals 31e of terminal plates 31A-31C are inserted into through holes 82a formed in a bottom 82 of the terminal insulation cup 81. Then, the output leads 41A-41C are soldered to the terminals 31e. Cut edges 41c of the output leads 41A-41C are covered with a sealing material 83. If the sealing material 83 has fluidity and can run, the sealing material 83 can be held in the terminal insulation cup 81. Thus, the cut edges 41c of the output leads 41A-41C can be suitably sealed by the sealing material 83. If the sealing material 83 has no or low fluidity and does not run, the terminal insulation cup 81 is not necessary. In such a case, the terminal insulation cup 81 may be omitted, and the cut edges 41c of the output leads 41A-41C may be covered by the sealing material 83 as shown in FIGS. 19 and 20. Thus, the cut edges 41c of the output leads 41A-41C can be suitably sealed.

Next, a terminal plate set 30 and a core 21 according to a further exemplary embodiment will be explained based on FIGS. 21 to 25.

The terminal plate set 30 shown in FIGS. 21 to 25 has multiple (for example, two) holding metals 91. The multiple holding metals 91 are attached to the uniting portion, or the resin mold 32, which unites the gathering portion (the terminals 31c, 31d for connecting the connection between the coil wire leads 25a, 25b with the other end side of the core 21). The core 21 is formed with locking holes 21d, into which the holding metals 91 are press-fit.

A through hole 91b is formed in a head 91a of the holding metal 91. A resin material flows into the through hole 91b and hardens there when the insertion molding of the terminal plate set 30 is performed with the use of the holding metal 91 as an inserted body. Thus, the holding metal 91 is tightly held by the resin mold 32. Protrusions 91d and a releasing hole 91e are formed in a middle portion of a leg 91c of the holding metal 91. The protrusions 91d are deformed when the holding metal 91 is press-fit into the locking hole 21d of the core 21. Thus, the leg 91c and the locking hole 21d are brought to a pressure-bonded state. Accordingly, the holding metal 91 is tightly held by the core 21. The releasing hole 91e of the holding metal 91 helps the deformation of the protrusions 91d during the press-fitting process.

Thus, the holding metals 91 are provided on the uniting portion, or the resin mold 32. Therefore, even if a large fluctuation between hot and cold is applied to the three-phase magnetic generator and creep is generated in the fitting legs 32a-32c of the resin mold 32, and even if the uniting strength between the fitting legs 32a-32c and the core 21 is reduced, the uniting strength can be maintained by the holding metals 91. The protrusions 91d formed on the holding metal 91 are press-fit into the locking hole 21d of the core 21. Therefore, the press-fitting process can be performed with a relatively small power. The releasing hole 91e of the holding metal 91 is deformed inward in the press-fitting process. Therefore, the press-fitting process can be performed with a small power. The resin material is filled into the through hole 91b of the holding metal 91. Accordingly, the bonding strength between the holding metal 91 and the resin mold 32 can be improved.

The present invention should not be limited to the described embodiments, but may be implemented in many other ways without departing from the spirit of the invention.

What is claimed is:

1. A three-phase magnetic generator having a rotor that has rare-earth magnets, and a stator that has three coil groups, the generator comprising:

a terminal plate set fixed into a fitting through hole formed in an annular portion of a core of the stator, the core provided radially inside winding portions of the stator, around which the coil groups are wound, wherein
the terminal plate set includes three substantially T-shaped terminal plates and a resin mold for fixing and holding the three terminal plates, each one of the terminal plates includes a transverse bar portion and a longitudinal bar portion, each one of the terminal plates includes a terminal of the transverse bar portion connected with a coil wire lead of a respective coil group and a terminal of the longitudinal bar portion connected with an output lead, the resin mold covers the three terminal plates except for the terminals and is formed with a fitting leg around the longitudinal bar portion, the fitting leg being press-fit into the fitting through hole, the terminal plate set is structured so that the terminal of the transverse bar portion is positioned near the coil wire lead on an axial end side of the rotor and the terminal of the longitudinal bar portion is positioned on the other axial end side of the rotor when the fitting leg is press-fit into the fitting through hole, and the coil groups are connected in a delta connection so that an electric angle phase difference substantially becomes 240°.

2. The generator as in claim 1, wherein
a length of the transverse bar portion of the terminal plate is set to position the terminal of the transverse bar portion near the end of the coil wire lead.

3. The generator as in claim 1, wherein
the terminal plates are formed with bonding holes filled with a resin.

4. The generator as in claim 1, wherein
the rotor has a pole number that is 4n, n being any one of integers from four to eight, and
the stator has a pole number that is 3n.

5. The generator as in claim 1, wherein
the winding portions of the core are coated with a powder resin coating.

6. The generator as in claim 1, wherein
each one of the coil groups is formed by winding a copper wire having a diameter that is from 1.3 mm to 2.0 mm, around the winding portions of the core in a same direction in a concentrated winding manner while skipping two winding portions.

7. The generator as in claim 5, wherein the coil groups are wound around the winding portions only through the powder resin coating.

* * * * *